United States Patent [19]
Oka

[11] Patent Number: 5,237,023

[45] Date of Patent: Aug. 17, 1993

[54] POLYANILINE DERIVATIVES AND THEIR PRODUCTION PROCESS

[75] Inventor: Osamu Oka, Shizuoka, Japan

[73] Assignee: Tomoegawa Paper Co., Ltd., Tokyo, Japan

[21] Appl. No.: 854,928

[22] Filed: Mar. 20, 1992

[30] Foreign Application Priority Data

| Mar. 25, 1991 | [JP] | Japan | 3-083026 |
| Mar. 25, 1991 | [JP] | Japan | 3-083027 |
| Mar. 25, 1991 | [JP] | Japan | 3-083028 |
| May 9, 1991 | [JP] | Japan | 3-132165 |
| Aug. 9, 1991 | [JP] | Japan | 3-223537 |
| Dec. 10, 1991 | [JP] | Japan | 3-349811 |

[51] Int. Cl.$^5$ .................................. C08G 73/00
[52] U.S. Cl. ........................ 525/540; 528/422
[58] Field of Search ................................ 525/540

[56] References Cited

U.S. PATENT DOCUMENTS 5,008,041  4/1991  Cameron et al. .................. 525/540

Primary Examiner—Ana L. Carrillo
Attorney, Agent, or Firm—Lowe, Price, LeBlanc & Becker

[57] ABSTRACT

Novel polyaniline derivatives soluble in general organic solvents are provided without impairment of the inherent good properties of the corresponding polyanilines. The novel polyaniline derivatives are polymers which substantially comprises a structural unit represented by the following formula (I)

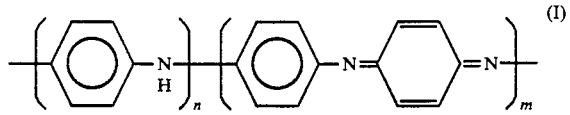

wherein m and n are each an integer of 0 or more but m and n are not zero simultaneously, and a structural unit represented by the following formula (II)

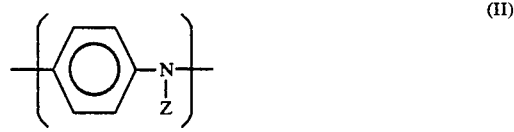

wherein Z means a group represented by the formula $-CHR^1-CHR^2-XH$, $-C(=W)-NH-R^1$ or $-C(=O)-Y-COOM$, where $R^1$ and $R^2$ denote each a hydrogen atom, a substituted or unsubstituted alkyl group, a substituted or unsubstituted alkenyl group, a substituted or unsubstituted aryl group or a substituted or unsubstituted benzyl group, X denotes an oxygen atom, a sulfur atom or NH, W denotes an oxygen or a sulfur atom, M represents a hydrogen atom or an alkali metal, and Y denotes a substituted or unsubstituted o-phenylene group, $-CR^1=CR^2-$ or $-CRH^1-CHR^2-$, $R^1$ and $R^2$ being the same as described above, said polymer having a degree of substitution of the N-hydrogen atoms of $k/(n+2m+k)=0.001-0.5$ wherein k is a number of the structural unit represented by the formula (II), and a polymerization degree of $n+2m+k=7-2000$.

12 Claims, No Drawings

POLYANILINE DERIVATIVES AND THEIR PRODUCTION PROCESS

BACKGROUND OF THE INVENTION

1. Field of the invention

The present invention relates to novel polyaniline derivatives soluble in organic solvents and also to their production process.

2. Description of the Related Art

Investigation has been conducted in recent years with a view toward applying polyanilines as new electronic materials or electroconductive materials in a wide variety of fields such as cell electrode materials, antistatic materials, electromagnetic shielding materials, functional devices—e.g., photoelectric transducers, optical memories and various sensors, display devices, various hybrid materials, transparent electroconductors, and various terminal equipment.

Polyanilines however have a highly developed π-conjugated system. They are hence accompanied by the serious drawbacks that they are insoluble in most organic solvents and do not melt even when heated due to having a rigid main chain and the existence of strong interaction and many strong hydrogen bonds between polymer chains and also have poor moldability and permit neither cast molding nor coating.

They are therefore formed, for example, into electroconductive composite materials by impregnating base materials of a desired shape—such as fibers, porous bodies or the like of high-molecular materials—with their corresponding aniline monomers and then bringing the monomers into contact with a suitable polymerization catalyst or subjecting the monomers to electropolymerization to polymerize the monomers. As an alternative, such aniline monomers are polymerized in the presence of powder of a thermoplastic polymer to obtain similar composite materials.

In the meantime, polyanilines soluble in N-methyl-2-pyrrolidone alone has also been synthesized by suitably choosing the polymerization catalyst and reaction temperature [M. Abe et al.: J. Chem. Soc.., Chem. Commun., 1989, 1736). These polyanilines are however practically insoluble in other general organic solvents so that their application field is limited.

Further, processes for introducing substituents into N-positions which comprise by reacting reduced polyaniline with alkyl halides or acylhalides are described in U.S. Ser. No. 07/693,268 now U.S. Pat. No. 5,100,977, Japanese Patent Applications 115162/1990 and U.S. Ser. No. 07/693,867. These processes however have drawbacks that dedoping treatment is required after conclusion of the reaction because of forming hydrogen chloride during the reaction, and consequently, they cause deterioration of yield and require troublesome steps. Moreover, the polyaniline derivatives produced are impossible to reform themselves because the substituents introduced into nitrogen atoms contained in the polyaniline have no reactivity.

SUMMARY OF THE INVENTION

The present invention has been completed with a view toward overcoming the problems described above.

An object of the present invention is therefore to provide a novel polyaniline derivative having reactive groups as side chains, which is soluble in general organic solvent or water and has excellent processability in casting, coating or impregnation, etc. Another object of the present invention is to provide a process for producing the novel polyaniline derivative without formation of impurities such as hydrogen halide, etc. during production steps.

As a result of earnest investigation with a view toward overcoming the above problems, the present inventor has found that the polyaniline derivative having reactive groups as side chains, which is soluble in general organic solvents or water and has excellent processability in casting, coating or impregnation, etc. can be easily produced by reacting a reduced polyaniline with an oxirane compound, an aziridine compound, a thiirane compound, an isocyanate compound, an isothiocyanate compound or a cyclic carboxylic acid anhydride compound, leading to the completion of the present invention. The present inventor has simultaneously found that such an polyaniline derivative can be obtained without formation of impurities such as hydrogen halides during the production steps, leading to the completion of the present invention.

Each polyaniline derivative according to the present invention is a novel polymer, which is a polymer composed of a structural unit represented by the following formula (I)

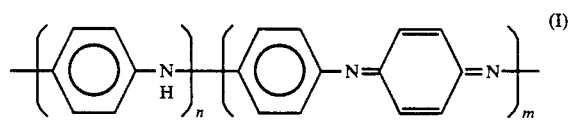

wherein m and n are each an integer of 0 or more but m and n are not zero simultaneously, and a structural unit represented by the following formula (II)

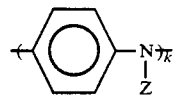

wherein Z means a group represented by the formula —CHR$^1$—CHR$^2$—X, —C(=W)—NH—R$^1$ or —C(=O)—Y—COOM, wherein R$^1$ and R$^2$ denote each a hydrogen atom, a substituted or unsubstituted alkyl group, a substituted or unsubstituted alkenyl group, a substituted or unsubstituted aryl group or a substituted or unsubstituted benzyl group, X denotes an oxygen atom, a sulfur atom or NH, W denotes an oxygen or a sulfur atom, M represents a hydrogen atom or an alkali metal, and Y denotes a substituted or unsubstituted o-phenylene group, —CR$^1$=CR$^2$—or —CHR$^1$—CHR$^2$—, R$^1$ and R$^2$ being the same meaning as defined above, said high polymer having a degree of substitution of the N-hydrogen atoms of k/(n+2m+k)=0.001−0.5 wherein k is a number of the structural unit represented by the formula (II), and a polymerization degree of n+2m+k=7—2000.

The above polyaniline derivative of the present invention can be produced by reacting a reduced polyaniline with at least one compound represented by the following formula (III), (IV) or (V)

-continued

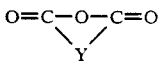

wherein X, W, Y, $R^1$ and $R^2$ have the same meanings as defined in the formula (I).

Described in more detail, a polyaniline is treated with ammonia to convert the polyaniline to a soluble polyaniline, which is then treated with excess hydrazine to convert it to a reduced polyaniline. After the reduced polyaniline is dissolved in an amide solvent or dispersed in an aromatic solvent or an ether solvent, at least one compound represented by the above formula (III) (IV) or (V) is added to introduce the substituent group Z to one or more of the nitrogen atoms of the reduced polyaniline.

The polyaniline derivative of the present invention is soluble in organic solvents and has excellent processability, for example, film formability, coating applicability, impregnation ability. Furthermore the polyaniline derivative of the present invention can be used in various fields, because it easily reacts with other materials because of having a functional reactive group in the substutuent introduced into the nitrogen atoms thereof. The production process of the present invention has advantages that it produces the polyaniline in a high purity without requiring a step of removing impurities because of not forming impurities during the production steps.

DETAILED DESCRIPTION OF PREFERRED EMBODIMENTS

The present invention will hereinafter be described in detail.

Usable for the production of the polyaniline derivative according to the present invention a polyaniline which has been obtained by oxidative polymerization of aniline using ammonium persulfate or the like as an oxidizing agents at a low temperature, for example, in the range of from −20° C. to 50° C. and which has a number average molecular weight of 2,000-500,000 (as measured by GPC in N-methyl-2-pyrrolidone as a solvent and converted relative to polystyrene). First of all, the polyaniline is treated with ammonia to convert it to a soluble polyaniline. The soluble polyaniline is then treated with excess hydrazine to prepare a reduced polyaniline. The term "reduced polyaniline" means a reduced product of the above polyaniline as obtained by the oxidative polymerization, said reduced product containing a hydrogen atom bonded to each of all nitrogen atoms contained in the polyaniline. The hydrazine treatment can be effected by dispersing the soluble polyaniline in water, adding hydrazine in an amount at least equivalent to, preferably three times the nitrogen atoms in the polyaniline under a nitrogen atmosphere and then stirring the resultant mixture at 0°-30° C. for 24 hours.

The reduced polyaniline thus obtained is soluble in N-methyl-2-pyrrolidone or N,N-dimethylacetamide but is practically insoluble in other general organic solvents, for example, chloroform and tetrahydrofuran.

Next, the reduced polyaniline was dissolved in an amide solvent or dispersed in an ether solvent or concentrated hydrochloric acid. The substitution reaction can be conducted by adding at least one of the compound represented by the formula (III)–(V) to the resultant solution or dispersion and then stirring the thus-obtained mixture in a temperature range of from −10° C. to 100° C., preferably 40°–80° C. under a nitrogen atmosphere for few hours -2 days.

Usable, exemplary amide solvents include N-methyl-2-pyrrolidone, N,N-dimethylacetamide, N,N-dimethylformamide, hexamethylphosphoric triamide, 1,3-dimethyl-2-imidazolidinone. Usable, illustrative aromatic solvents include benzene, toluene, xylene, ethylbenzene and tetralin. Further, usable ether solvents include ether, tetrahydrofuran and dioxane.

In the formulas (III)–(V), $R^1$ and $R^2$ may be identical or different each other, which denote each a hydrogen atom, a substituted or unsubstituted alkyl group, a substituted or unsubstituted alkenyl group, a substituted or unsubstituted aryl group or a substituted or unsubstituted benzyl group.

Exemplary, substituted or unsubstituted alkyl groups include linear alkyl groups such as ethyl, propyl, butyl, pentyl, hexyl, heptyl, octyl, nonyl, decyl, undecyl, dodecyl hexadecyl, docosyl; branched alkyl groups such as isobutyl, isopentyl, neopentyl, isohexyl; cyclic alkyl groups such as cyclohexyl; and those obtained by substituting one or more of their hydrogen atoms with a like number of halogen atoms and/or cyano, nitro, alkoxyl, ester and/or hydroxyl groups.

Example of substituted or unsubstituted alkeyl groups include butenyl, pentenyl and hexenyl groups and those obtained by substituting one or more of their hydrogen atoms by a like number of halogen atoms and/or cyano, nitro, alkoxyl, ester and/or hydroxyl groups.

Illustrative, substituted or unsubstituted aryl groups include a phenyl group and those obtained by substituting one or more of the hydrogen atoms of a phenyl group with a like number of halogen atoms and/or alkyl, phenyl, cyano, nitro, alkoxyl, ester, and/or hydroxyl groups.

Examples of one or more substituent groups in the substituted benzyl group include halogen atoms and/or cyano, nitro, alkoxyl, ester, and/or hydroxyl groups.

Preferred, specific examples of the compounds represented by the above formulas (III)–(V) include the following compounds. Preferred examples of oxirane compounds include propylene oxide, 1,2-dodecylene oxide, styrene oxide, epichlorohydrin, epibromohydrin, glycidyl metacrylate, and the like.

Preferred examples of aziridine compounds include aziridine, 2-ethyl aziridine, and the like.

Preferred examples of thiirane compounds include thiirane, 2-ethyl thiirane, and the like.

Preferred examples of isocyanate compounds and isothiocyanate compounds include n-propyl isocyanate, n-butyl isocyanate, octyl isocyanate, dodecyl isocyanate, p-chlorophenyl isocyanate, anisyl isocyanate, n-propyl isothiocyanate, n-butyl isothiocyanate, octyl isothiocyanate, dodecyl isothiocyanate, p-chlorophenyl isothiocyanate, anisyl isothiocyanate, and the like.

Preferred examples of carboxylic acid internal anhydride compounds include phthalic anhydride, 3-nitorophthalic anhydride, maleic anhydride, diphenylmaleic anhydride, succinic anhydride, n-octylsuccinic anhydride, 3-sulfophthalic anhydride, alkali or ammonium salt thereof, and 4-sulfophthalic anhydride, alkali or ammonium salt thereof, and the like.

In the present invention, when the carboxylic acid internal anhydride compounds are used, the hydrogen atoms in the carboxyl group and sulfonic acid group, if be existent, can be easily converted into alkali metals or ammonium groups after conclusion of reaction. Namely, a reaction mixture after conclusion of the reaction is poured in alcohol to precipitate the product, which is then taken out and dried to obtain a polyaniline derivative in which M in the formula (V) is hydrogen atom. The hydrogen atom in M is then converted into alkali metal or ammonium group by treating the resultant polyaniline with an aqueous solution of alkali metal hydroxide such as sodium hydroxide or an aqueous alcohol solution.

In the present invention, the substitution reaction caused by the compound represented by the formula (III), (IV) or (V) can be conducted preferably in such a manner that substituent groups Z can be introduced to 0.1-50% of the nitrogen atoms contained in the reduced polyaniline. If the substitution degree is less than 0.1%, the polyaniline derivatives do not have sufficient solubility in organic solvents. If beyond 50%, it becomes difficult to exhibit conductivity by doping.

It is desirable to subject the N-substituted polyaniline derivative, which has been obtained as described above, to undoping treatment as a post treatment with aqueous ammonia.

Each polyaniline derivative according to the present invention, which can be produced as described above, is soluble not only in N-methyl-2-pyrrolidone and N,N-dimethylacetamide but also in halogenated hydrocarbon solvents such as chloroform, dichloroethane and dichloromethane and ether solvents such as tetrahydrofuran. Using a solution of the polyaniline derivative in one of these solvents, a good selfstanding film can be obtained by casting. The films so formed shows conductivity as high as $10^{-3}$-$10^1$ S/cm after it had been doped in a protonic acid such as hydrochloric acid, sulfuric acid, fluoroboric acid or perchloric acid.

EXAMPLES

The present invention will hereinafter be described by following examples.

EXAMPLE 1

(1) Production of reduced polyaniline 4.1 g of aniline and 21.9 g of concentrated hydrochloric acid were dissolved in water to give 100 ml of an aniline solution. The aniline solution was chilled to $-5°$ C. 21.9 g of concentrated hydrochloric acid and 6.28 g of ammonium persulfate were also dissolved in water to give 100 ml of a solution. The latter solution was also chilled to $-5°$ C. and was then slowly added dropwise to the aniline solution, followed by stirring at 5° C. for 4 hours. The thus-obtained polyaniline having a number average molecular weight of 12,000 (as measured by GPC in N-methyl-2-pyrrolidone as a solvent and converted relative to polystyrene) was washed thoroughly with water, followed by undoping treatment with aqueous ammonia.

The resulting soluble polyaniline was dispersed in 200 ml of water, followed by the addition of 50 ml of hydrazine in a nitrogen atmosphere. The mixture thus obtained was continuously stirred for 24 hours at room temperature. The resultant solid precipitate was collected by filtration and then dried, whereby a reduced polyaniline of a grayish white color was obtained.

(2) Production of polyaniline with substituted nitrogen atoms 1 g of the reduced polyaniline so obtained was completely dissolved in 30 ml of N-methyl-2-pyrrolidone. After the reaction system having been thoroughly purged with nitrogen gas, propylene oxide was added in an amount of 0.64 g (100% by mol to nitrogen atoms in the reduced polyaniline), and the resultant mixture was stirred at 80% for 12 hours so that they were reacted. The reaction mixture was poured into 1 litter of water while the resulting mixture was stirred. The resulting precipitate was collected by filtration, dried and then subjected to undoping treatment with aqueous ammonia, whereby a polyaniline derivative with substituted nitrogen atoms was obtained in an amount Of 1.2 g. From the yield of the reaction, the degree Of substitution of N-hydrogen atoms was found to be 31%. The alcoholic hydroxyl group in the substituted group was confirmed by the existence of an IR absorption at 3355 cm$^{-1}$.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was satisfactorily obtained by casting. Its conductivity was 0.01 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane, tetrahydrofuran and methanol.

EXAMPLE 2

1 g of the reduced polyaniline used in Example 1 was dispersed in 30 ml of 6N hydrochloric acid. 1.56 g of glycidyl methacrylate was added to the resultant dispersion, which was stirred at 80° C. for 12 hours so that they were reacted. The resulting precipitate was collected by filtration, dried and then subjected to undoping treatment with aqueous ammonia, whereby a polyaniline derivative with substituted nitrogen atoms was obtained in an amount of 1.4 g. From the yield of the reaction, the degree of substitution of N-hydrogen atoms was found to be 26%. The alcoholic hydroxyl group in the substituted group was confirmed by the existence of an IR absorption at 3355 cm$^{-1}$.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was satisfactorily obtained by casting. Its conductivity was 0.01 S/cm after having been doped with sulfuric acid.

Further, the film before the doping was successfully dissolved in the same organic solvents as in Example 1.

Example 3

A polyaniline derivative with substituted nitrogen atoms (1.5 g) was obtained in a similar manner to Example 1 except that styrene oxide (1.3 g) (100% by mol to nitrogen atoms contained in the reduced polyaniline) was used in lieu of propylene oxide. From the yield of the reaction, the degree of substitution of N-hydrogen atoms was found to be 389%. The alcoholic hydroxyl group in the substituted group was confirmed by the existence of an IR absorption at 3355 cm$^{-1}$.

The resultant polyaniline derivative showed high solubility in the same organic solvents as described in Example 1. From a solution of the polyaniline derivative in chloroform, a self-standing film was satisfactorily obtained by casting. Its conductivity was 0.01 S/cm after having been doped with sulfuric acid.

Further, the film before the doping was successfully dissolved in the same organic solvents as in Example 1.

EXAMPLE 4

A polyaniline derivative with substituted nitrogen atoms (1.7 g) was obtained in a similar manner to Example 1 except that 1,2-dodcylene oxide (2 g) (100% by mol to nitrogen atoms contained in the reduced pplyaniline) was used in lieu of propylene oxide. From the yield of the reaction, the degree of substitution of N-hydrogen atoms was found to be 34%. The alcoholic hydroxyl group in the substituted group was confirmed by the existence of an IR absorption at 3355 cm$^{-1}$.

The resultant polyaniline derivative showed high solubility in the same organic solvents as described in Example 1. From a solution of the polyaniline derivative i chloroform, a self-standing film was satisfactorily obtained by casting. Its conductivity was 0.01 S/cm after having been doped with sulfuric acid.

Further, the film before the doping was successfully dissolved in the same organic solvents as in Example 1.

EXAMPLE 5

A polyaniline derivative with substituted nitrogen atoms (1.6 g) was obtained in a similar manner to Example 2 except that epichlorohydrin (1.02 g) (100% gy mol to nitrogen atoms contained in the reduced polyaniline) was used in lieu of glycidyl methacrylate. From the yield of the reaction, the degree of substitution of N-hydrogen atoms was found to be 59%. The alcoholic hydroxyl group in the substituted group was confirmed by the existence of an IR absorption at 3355 cm$^{-1}$.

The resultant polyaniline derivative showed high solubility in the same organic solvents as described in Example 1. From a solution of the polyaniline derivative in chloroform, a self-standing film was satisfactorily obtained by casting. Its conductivity was 0.02 S/cm after having been doped with sulfuric acid.

Further, the fill before the doping was successfully dissolved in the same organic solvents as in Example 1.

EXAMPLE 6

A polyaniline derivative with substituted nitrogen atoms (1.2 g) was obtained in a similar manner to Example 1 except that aziridine (0.47 g) (100% by mol to nitrogen atoms contained in the reduced polyaniline) was used in lieu of propylene oxide. From the yield of the reaction, the degree of substitution of N-hydrogen atoms was found to be 42%. The primary amino group in the substituted group was confirmed by the existence of absorptions at 3365 and 3290 cm$^{-1}$.

The resultant polyaniline derivative showed high solubility in the same organic solvents as described in Example 1. From a solution of the polyaniline derivative in chloroform, a self-standing film was satisfactorily obtained by casting. Its conductivity was 0.01 S/cm after having been doped with sulfuric acid.

Further, the film before the doping was successfully dissolved in the same organic solvents as in Example 1.

EXAMPLE 7

A polyaniline derivative with substituted nitrogen atoms (1.2 g) was obtained in a similar manner to Example 1 except that 2-ethyl aziridine (0.789 g) (100% by mol to nitrogen atoms contained in the reduced polyaniline) was used in lieu of propylene oxide. From the yield of the reaction, the degree of substitution of N-hydrogen atoms was found to be 26%. The primary amino group in the substituted group was confirmed by the existence of IR absorptions at 3365 and 3290 cm$^{-1}$.

The resultant polyaniline derivative showed high solubility in the same organic solvents as described in Example 1. From a solution of the polyaniline derivative in chloroform, a self-standing film was satisfactorily obtained by casting. Its conductivity was 0:01 S/cm after having been doped with sulfuric acid.

Further, the film before the doping was successfully dissolved in the same organic solvents as in example 1.

EXAMPLE 8

1 g of the reduced polyaniline used in Example 1 was completely dissolved in 30 ml of N-methyl-2-pyrrolidone. After the reaction system having been thoroughly purged with nitrogen gas, thiirane and silver halide were added in amounts of 0.66 g (100% by mol to nitrogen atoms contained in the reduced polyaniline) and 0.01 g, and the resultant mixture was stirred at 50° C. for 5 hours to that they were reacted. The reaction mixture was poured into 1 litter of water while the resulting mixture was stirred. The resulting precipitate was collected by filtration, dried and then subjected to undoping treatment with aqueous ammonia, whereby a polyaniline derivative with substituted nitrogen atoms was obtained in an amount of 1.3 g. From the yield of the reaction, the degree of substitution of N-hydrogen atoms was found to be 64%. The mercapto group in the substituted group was confirmed by the existence of an IR absorption at 2565 cm$^{-1}$.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was satisfactorily obtained by casting. Its conductivity was 0.01 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane, tetrahydrofuran and methanol.

EXAMPLE 9

A polyaniline derivative with substituted nitrogen atoms (1.3 g) was obtained in a similar manner to Example 8 except that 2-ethyl thiirane (0.97 g) (100% by mol to nitrogen atoms contained in the reduced polyaniline) was used in lieu of thiirane. From the yield of the reaction, the degree of substitution of N-hydrogen atoms was found to be 31%. The mercapto group in the substituted group was confirmed by the existence of an R absorption at 2565 cm$^{-1}$.

The resultant polyaniline derivative showed high solubility in the same organic solvents as described in Example 8. From a solution of the polyaniline derivative in chloroform, a self-standing film was satisfactorily obtained by casting. Its conductivity was 0.01 S/cm after having been doped with sulfuric acid.

Further, the film before the doping was successfully dissolved in the same organic solvents as in Example 1.

EXAMPLE 10

1 g of the reduced polyaniline used in example 1 was completely dissolved in 30 ml of N-methyl-2-pyrrolidone. After the reaction system having been thoroughly purged with nitrogen gas, n-propyl isocyanate was added in an amount of 0.47 g (60% by mol to nitrogen atoms contained in the reduced polyaniline), and the resultant mixture was stirred for 6 hours so that they were reacted. The reaction mixture was poured into 1 litter of water while the resulting mixture was stirred. The resulting precipitate was collected by filtration, dried and then subjected to undoping treatment with aqueous ammonia, whereby a polyaniline derivative with carbamoylated nitrogen atoms was obtained in an amount of 1.2 g. Carbamolylated structure of the resultant polyaniline derivative was confirmed by the existence of IR absorptions at 1650 and 3400 cm$^{-1}$. From the yield of the reaction, the degree of substitution of N-hydrogen atoms was found to be 42%.

The polyaniline derivative was soluble in N-methyl-2-pyrrolidone and also showed high solubility in organic solvents such as chloroform, dichloroethane, dichloromethane and tetrahydrofuran. From a solution of the polyaniline derivative in chloroform, a self-standing film was satisfactorily obtained by casting. Its conductivity was 0.07 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 11

A polyaniline derivative with substituted nitrogen atoms (1.4 g) was obtained in a similar manner to Example 10 except that dodecyl isocyanate (1.2 g) (50% by mol to nitrogen atoms contained in the reduced polyaniline) was used in lieu of n-propyl isocyanate. Carbamoylated structure o the resultant polyaniline derivative was confirmed by the existence of IR absorptions at 1650 and 3400 bm$^{-1}$. From the filed of the reaction, the degree of substitution of N-hydrogen atoms was found to be 33%.

The resultant polyaniline derivative showed high solubility fin the same organic solvents as described in Example 10. From a solution of the polyaniline derivative n chloroform, a self-standing film was satisfactorily obtained by casting. Its conductivity was 0.02 S/cm after having been doped with sulfuric acid.

Further, the film before the doping was successfully dissolved in the same organic solvents as in Example 10.

EXAMPLE 12

A polyaniline derivative with substituted nitrogen atoms (1.2 g) was obtained in a similar manner to Example 10 except that p-chlorophenyl isocyanate 0185 g (50% by mol to nitrogen atoms in the reduced polyaniline) was used in lieu of n-propyl isocyanate. Cabamoylated structure o the resultant polyaniline derivative was confirmed by the existence of IR absorptions at 1650 and 3400 cm$^{-1}$. From the shield of the reaction, the degree of substitution of N-hydrogen atoms was found to be 25%.

The resultant polyaniline derivative showed high solubility in the same organic solvents as described in Example 10. From a solution of the polyaniline derivative in chloroform, a self-standing film was satisfactorily obtained by casting. Its conductivity was 0.09 S/cm after having been doped the sulfuric acid.

Further, the film before the doping was successfully dissolved in the same organic solvents as in Example 10.

EXAMPLE 13

A polyaniline derivative with substituted nitrogen atoms (1.3 g) was obtained in a similar manner to Example 10 except that anysyl isocyanate (0.82 g) (50% by mol to nitrogen atoms contained in the reduced polyaniline) was used in lieu of n-propyl isocyanate. Carbamoylated structure of the resultant polyaniline derivative was confirmed by the existence of IR absorptions at 1650 and 3400 cm$^{-1}$. From the yield of he reaction, the degree of substitution of N-hydrogen atoms was found to be 37%.

The resultant polyaniline derivative showed high solubility in the same organic solvents as described in Example 10. From a solution of the polyaniline derivative in chloroform, a self-standing film was satisfactorily obtained by casting. Its conductivity was 0.01 S/cm after having been doped with sulfuric acid.

Further, the film before the doping was successfully dissolved in the same organic solvents as in Example 10.

EXAMPLE 14

A polyaniline derivative with substituted nitrogen atoms (1.2 g) was obtained in a similar manner to Example 10 except that n-propyl isothiocyanate (0.82 g) (50% by mol to nitrogen atoms contained in the reduced polyaniline) was housed in lieu of n-propyl isocyanate. Thiocabamoylated structure of the resultant polyaniline derivative was confirmed by the existence of an IR absorption at 1250 cm$^{-1}$. From the yield of the reaction, the degree of substitution of N-hydrogen atoms was found to be 36%.

The resultant polyaniline derivative showed high solubility in the same organic solvents as described in Example 10. From a solution o the polyaniline derivative in chloroform, a self-standing film was satisfactorily obtained by casting. Its conductivity was 0.07 S/cm after having been doped with sulfuric acid.

Further, the film before the doping was successfully dissolved in the same organic solvents as in Example 10.

EXAMPLE 15

A polyaniline derivative with substituted nitrogen atoms (1.5 g) was obtained in a similar manner to Example 10 except that dodecyl isothiocyanate (1.2 g) (50% by mol to nitrogen atoms contained in the reduce polyaniline) was used in lieu of n-propyl isocyanate. Thiocarbamoylated structure of the resultant polyaniline derivative was confirmed by the existence of an IR absorption at 1250 cm$^{-1}$. From the yield of the reaction, the degree of substitution of N-hydrogen atoms was found to be 40%.

The resultant polyaniline derivative showed high solubility in the same organic solvents as described in Example 10. From a solution of the polyaniline derivative in chloroform, a self-standing film was satisfactorily obtained by casting. Its conductivity was 0.009 S/cm after having been doped with sulfuric acid.

Further, the film before the doping was successfully dissolved in the same organic solvents as in Example 10.

EXAMPLE 16

A polyaniline derivative with substituted nitrogen atoms (0.93 g) was obtained in a similar manner to Example 10 except that p-chlorophenyl isothiocyanate 1.32 g (50% by mol to nitrogen atoms contained in the reduced polyaniline) was used in lieu of n-propyl isocyanate. Thiocarbamoylated structure of the resultant polyaniline derivative was confirmed by the existence of an IR absorption at 1250 cm$^{-1}$. From the yield of the reaction, the degree of substitution of N-hydrogen atoms was found to be 34%.

The resultant polyaniline derivative showed high solubility in the same organic solvents as described in Example 10. From a solution of the polyaniline derivative in chloroform, a self-standing film was satisfactorily obtained by casting. Its conductivity was 0.01 S/cm after having been doped with sulfuric acid.

Further, the film before the doping was successfully dissolved in the same organic solvents as in Example 10.

EXAMPLE 17

A polyaniline derivative with substituted nitrogen atoms (1.1 g) was obtained in a similar manner to Example 10 except that anysyl isothiocyanate (0.90 g) (50% by mol to nitrogen atoms in the reduced polyaniline) was used in lieu of n-propyl isocyanate. Thiocarbamoylated structure of the resultant polyaniline derivative was confirmed by the existence of an IR absorption at 1250cm$^{-1}$. From the yield of the reaction, the degree of substitution of N-hydrogen atoms was found to be 11%.

The resultant polyaniline derivative showed high solubility in the same organic solvents as described in Example 10. From a solution of the polyaniline derivative in chloroform, a self-standing film was satisfactorily obtained by casting. Its conductivity was 0.1 S/cm after having been doped with sulfuric acid.

Further, the film before the doping was successfully dissolved in the same organic solvents as in Example 10.

EXAMPLE 18

1 g of the reduced polyaniline used in Example 1 was completely dissolved in 30 ml of N-methyl-2-pyrrolidone. After the reaction system having been thoroughly purged with nitrogen gas, succinic anhydride was added in an amount of 0.553 g (50% by mol to nitrogen atoms contained in the reduced polyaniline), and the resultant mixture was stirred at 60° C. for 6 hours so that they were reacted. The reaction mixture was poured into 1 litter of methanol while the resulting mixture was stirred. The resulting precipitate was collected by filtration, dried. The yield was 1.453 g. From the yield of the reaction, the degree of substitution of N-hydrogen atoms was found to be 41%. N-Substituted structure of the resultant polyaniline derivative was confirmed by the existence of IR IR absorptions at 1660 cm$^{-1}$ assigned to amide groups, 3100-2000 cm$^1$ assigned to aniline groups and 1595 cm$^1$ assigned to a carboxylic acid ions.

The polyaniline derivative was soluble in N-methyl-2-pyrrolidone and also showed high solubility in organic solvents such as chloroform, dichloroethane, dichloromethane and tetrahydrofuran. It was soluble in a 0.1 N aqueous solution of sodium hydroxide. From a solution of the polyaniline derivative in chloroform, a self-standing film was satisfactorily obtained by casting. Its conductivity was 0.07 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 19

A polyaniline derivative having carboxyl group containing substituent in nitrogen atoms (1.618 g) was obtained in a similar manner to Example 18 except that phthalic anhydride (0.814 g) (50% by mol to nitrogen atoms in the reduced polyaniline) was used in lieu of succinic anhydride. From the yield of the reaction, the degree of substitution of N-hydrogen atoms was found to be 38%. N-Substituted structure of the resultant polyaniline derivative was confirmed by the existence of IR absorptions at 1660cm$^{-1}$ assigned to amide groups, 3100-2000 cm$^{-1}$ assigned to aniline groups and 1595 cm$^{-1}$ assigned to carboxylic acid ions.

The resultant polyaniline derivative showed high solubility in the same organic solvents as described in Example 18. It was soluble in a 0.1 N aqueous solution of sodium hydroxide. From a solution of the polyaniline derivative in chloroform, a self-standing film was satisfactorily obtained by casting. Its conductivity was 0.06 S/cm after having been doped with sulfuric acid.

Further, the film before the doping was successfully dissolved in organic solvents such as N-methyl-2-pyrrolidone, N,N-dimethylacetamide, chloroform, dichloroethane, dichloromethane and tetrahydrofuran.

EXAMPLE 20

A polyaniline derivative having carboxyl group containing substituent in nitrogen atoms (1.458 g) was obtained in a similar manner to Example 18 except that maleic anhydride (0.538 g) (50% by mol to nitrogen atoms contained in the reduced polyaniline) was used in lieu of succinic anhydride. From the yield Of the reaction, the degree Of substitution of N-hydrogen atoms was found to be 42%. N-Substituted state of the resultant polyaniline derivative was confirmed by the existence of IR absorptions at 1660 cm$^{-1}$ assigned to amide groups, 3100-2000 cm$^{-1}$ assigned to anilinium groups and 1595 cm assigned to carboxylic acid ions.

The resultant polyaniline derivative showed high solubility in the same organic solvents as described in Example 18. It was soluble in a 0.1 N aqueous solution of sodium hydroxide. From a solution of the polyaniline derivative in chloroform, a self-standing film was satisfactorily obtained by casting. Its conductivity was 0.09 S/cm after having been doped with sulfuric acid.

Further, the film before the doping was successfully dissolved in the same organic solvents as in Example 18.

EXAMPLE 21

A polyaniline derivative having carboxyl group containing substituent in nitrogen atoms was obtained in a similar manner to Example 18 except that 4-sulfophthalic anhydride (1.25 g) (50% by mol to nitrogen atoms contained in the reduced polyaniline) was used in lieu of succinic anhydride. The resultant polyaniline derivative had polymerization degree: n+m+k=200. The yield was 2.00 g From the yield of the reaction, the degree of substitution of N-hydrogen atoms was found to be 40%. N-Substituted state of the resultant polyaniline derivative was confirmed by the existence of IR absorptions at 1660 cm$^{-1}$ assigned to amide groups, 3100-2000 cm$^{-1}$ assigned to anilinium groups, 1595 cm$^{-1}$ assigned to carboxylic acid ions and 1190 and 1063 cm$^{-1}$ assigned to sulfonic acid ions.

The resultant polyaniline derivative showed high solubility in the same organic solvents as described in Example 18. It was soluble in a 0.1 N aqueous solution of sodium hydroxide. From a solution of the polyaniline derivative in chloroform, a self-standing film was satisfactorily obtained by casting. Its conductivity was 0.07 S/cm after having been doped with sulfuric acid.

Further, the film before the doping was successfully dissolved in the same organic solvents as in Example 18.

EXAMPLE 22

A polyaniline derivative having carboxyl group containing substituent in nitrogen atoms (1.025 g) was obtained in a similar manner to Example 21 except that 4-sulfophthalic anhydride was used in an amount of 0.025 g (1% by mol to nitrogen atoms in contained the reduced polyaniline) instead of 1.25 g. The resultant polyaniline derivative had polymerization degree: n+m+k=190. From the yield of the reaction, the degree of substitution of N-hydrogen atoms was found to be 1%. N-Substituted structure of the resultant polyaniline derivative was confirmed by the existence of IR absorptions at 1660 cm$^{-1}$ assigned to amide groups, 3100-2000 cm$^{-1}$ assigned to anilinium groups, 1595 cm$^{-1}$ assigned to carboxylic acid ions and 1190 and 1063 cm$^{-1}$ assigned to sulfonic acid ions.

The resultant polyaniline derivative showed high solubility in the same organic solvents as described in Example 18. It was soluble in a 0.1 N aqueous solution of sodium hydroxide. From a solution of the polyaniline derivative in chloroform, a self-standing film was satisfactorily obtained by casting. Its conductivity was 0.5 S/cm after having been doped with sulfuric acid.

Further, the film before the doping was successfully dissolved in the same organic solvent as in Example 18.

What is claimed is:

1. A polyaniline derivative which substantially comprises a construction unit represented by the following formula (I)

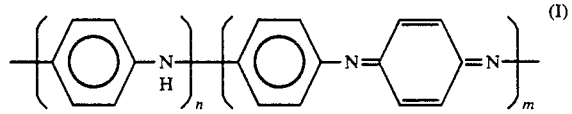

wherein m and n are each an integer of 0 or more but m and n are not zero simultaneously, and a structural unit represented by the following formula (II)

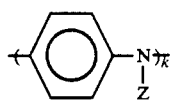

wherein Z means a group represented by the formula —CHR$^1$—CHR$^2$—XH, —C(=W)—NH—R$^1$ or —C(=O)—Y—COOM, wherein R$^1$ and R$^2$ denote each a hydrogen atom, a substituted or unsubstituted alkyl group, a substituted or unsubstituted alkenyl group, a substituted or unsubstituted aryl group or a substituted or unsubstituted benzyl group, X denotes an oxygen atom, a sulfur atom or NH, W denotes an Oxygen or a sulfur atom, M represents a hydrogen atom or an alkali metal, and Y denotes a substituted or unsubstituted o-phenylene group, —CR$^1$=CR$^2$— or —CHR$^1$—CHR$^2$—, R$^1$ and R$^2$ being the same as described above, said polymer having a degree of substitution of the N-hydrogen atoms of k/(n+2m+k)=0.001−0.5 wherein k is a number of the structural unit represented by the formula (II), and a polymerization degree of n+2m+k=7−2000.

2. The polyaniline derivative as set forth in claim 1, wherein Z in the formula (11) is a group represented by the following formula

—CHR$^1$—CHR$^2$—XH wherein X, R$^1$ and R$^2$ have the same meaning as defined above.

3. The polyaniline derivative as set forth in claim 2, wherein X is an oxygen atom.

4. The polyaniline derivative as set forth in claim 2, wherein X is a sulfur atom.

5. The polyaniline derivative as set forth in claim 2, wherein X is —NH—.

6. The polyaniline derivative as set forth in claim 1, wherein Z in the formula (II) is the group represented by the following formula

—C(=W)—NH—R$^1$ wherein W and R$^1$ have the same meaning as defined above.

7. The polyaniline derivative as set forth in claim 1, wherein Z in the formula (II) is the group represented by the following formula

—C(=O)—Y—COOM wherein Y and M have the same meaning as defined above.

8. The polyaniline derivative as set forth in claim 7, wherein Y is the group represented by the following formula

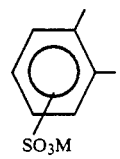

9. A process for production of the polyaniline derivative of claim 1, which comprises reacting a reduced polyaniline with at least a compound represented by the following formula (III), (IV) or (V)

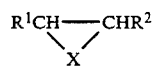 (III)

R$^1$NCW (IV)

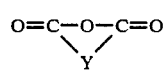 (V)

wherein X, W, Y, R$^1$ and R$^2$ are the same meaning as defined above.

10. The process as set forth in claim 9, which comprises reacting the reduced polyaniline with a compound represented by the following formula (III)

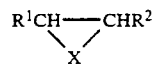 (III)

wherein X R$^1$ and R$^2$ are the same meaning as defined above.

11. The process as set forth in claim 9, which comprises reacting a reduced polyaniline with a compound represented by the following formula (IV)

R¹NCW (IV)

wherein W and R¹ are the same meaning as defined above.

12. The process as set forth in claim 9, which comprises reacting a reduced polyaniline with a compound represented by the following formula (V)

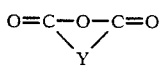
(V)

wherein Y is the same meaning as defined above.

* * * * *